Patented July 4, 1950

2,513,994

UNITED STATES PATENT OFFICE 2,513,994

PRODUCTION OF SYNTHESIS GAS

Donald D. Davidson, Long Beach, Calif., assignor to Shell Development Company, San Francisco, Calif., a corporation of Delaware No Drawing. Application December 31, 1946,
Serial No. 719,614

7 Claims. (Cl. 48—196)

This invention relates to the production of mixtures of carbon monoxide and hydrogen suitable for use in Fischer-Tropsch synthesis of hydrocarbons and related processes for the synthesis of alcohols, aldehydes, acids and other oxygenated organic compounds. More particularly the invention relates to the production of such gas mixtures, commonly referred to as synthesis gas, from methane or methane-containing gases such as natural gas, coke oven gas and the like, by reaction with metal oxides.

In the reaction of methane with metal oxides in the absence of any appreciable quantity of added oxidizing gas such as air or steam, several reactions take place simultaneously. Some of the more important reactions are:

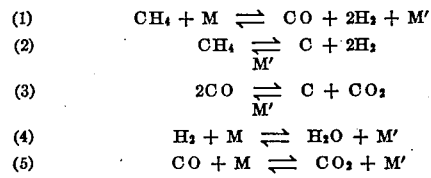

where M in each case is the metal oxide and M' is either the reduced metal or a lower oxide.

In most cases the result of the reaction of methane with a metal oxide in the absence of added steam is the formation of carbon and hydrogen with minor amounts of carbon dioxide, carbon monoxide and water. Thus, the reaction of methane with metal oxides is a well known method for the production of carbon for use in rubber and as a pigment. In this connection the following patents may be noted by way of example: U. S. 1,497,751; 1,894,126; 1,906,462; 1,964,744 and 2,008,270.

A great number of materials have been found which catalyze the formation of carbon. For example, the metals Fe, Co, Ni, Cu, Al, Mg, Mn, Mo, Pd, Pt, W, the oxides of Ba, Co, Fe, Mn, Zn and Zn+K, and the following carbonaceous materials: carbon, carbon-brick, carbon-chamotte, carbon fragments, charcoal, coke, graphite and Carborundum, have each been shown to promote the production of carbon from methane. (J. Phys. Chem. 34, 1617–1740 (1930).) In the reaction of methane with a metal oxide, both the metal oxide and its reduction product are present in the reaction zone. It will be noted that practically all of the metal oxides available for reaction with methane either catalyze carbon formation themselves or catalyze carbon formation upon being reduced in the reaction. It will also be noted that carbon itself is a similar catalyst and that therefore the production of carbon is in a sense autocatalytic.

A number of attempts have been made to utilize the reaction of methane with metal oxides to produce mixtures of carbon monoxide and hydrogen suitable for use in synthesis. By suitable choice of reaction conditions (generally including a higher reaction temperature), reaction (1) above may be made to predominate over the other reactions. However, these other reactions take place at substantial rates so that a considerable amount of carbon black is nevertheless formed. This represents relative inefficient utilization of the methane. Better efficiency of methane utilization in the production of synthesis gas can be obtained by direct partial combustion with oxygen or air. Consequently, as far as known, the production of synthesis gas by the reaction of methane with metal oxides has not achieved any commercial importance.

It has now been found, contrary to what might be expected from the teachings of the art, that the reaction of methane with solid metal oxides to produce synthesis gas may be materially increased in efficiency by effecting the reaction in the presence of an alkali catalyzer. Thus, for example, a natural gas having approximately the following composition:

| | Per Cent |
|---|---|
| $CH_4$ | 78.3 |
| $C_2H_6$ | 10.4 |
| $C_3H_8$ | 6.1 |
| $C_4+$ | 0.1 |
| $CO_2$ | 2.3 |
| $O_2$ | 0.6 |
| $N_2$ | 2.2 | was used to produce synthesis gas by reaction with chromium oxide. Pertinent data are given in the following Table I:

Table I

| | I | II | III |
|---|---|---|---|
| Average Temperature, °F | 2,008 | 1,957 | 2,035 |
| Contact Time[1], seconds | 0.45 | 0.48 | 0.47 |
| Average[2], Composition of Product Gas on Air-Free Basis: | | | |
| $CO$ | 23.1 | 21.6 | 19.2 |
| $CO_2$ | 0.6 | 1.6 | 0.9 |
| $H_2$ | 73.9 | 73.1 | 77.0 |
| $CH_4$ | 1.4 | 2.2 | 1.9 |
| Conversion of $CH_4$, percent | 97 | 95 | 96 |
| Carbon black, percent of C in methane reacted | 43 | 46 | 58 |

[1] The contact times given are so-called apparent contact times and are obtained by dividing the volume of the bed by the volumes of natural gas at standard conditions passed through the bed per second.
[2] The conversion and composition of the gaseous product varies somewhat during the process period as the reaction proceeds.

When the reaction was carried out in the presence of an alkali as a catalyst, the corresponding pertinent data were as given in Table II. The alkali catalyst was sodium carbonate added to the chromium oxide in an amount equivalent to 5% by weight of sodium. The sodium carbonate decomposed to sodium oxide before reaching the reaction temperature.

*Table II*

|  | I | II |
|---|---|---|
| Average Temperature, °F | 1,875 | 1,993 |
| Contact Time, seconds | 0.42 | 0.78 |
| Average composition of Product Gas on Air-Free Basis: | | |
| CO | 25.6 | 26.3 |
| $CO_2$ | 0.7 | 0.1 |
| $H_2$ | 70.3 | 67.9 |
| $CH_4$ | 2.9 | 5.2 |
| Conversion of $CH_4$, percent | 93 | 93 |
| Carbon black, percent of C in methane reacted | 35 | 35 |

As will be seen, the loss of methane converted to carbon black was reduced by about 20 to 40%. The saving is found in the quality and quantity of the synthesis gas produced. Thus, by the use of the alkali catalyzer an increased yield of superior synthesis gas was produced at the expense of the formation of carbon black. Also, this result could be achieved while operating at a somewhat lower temperature. Experiment II of Table II is of particular interest since it indicates that the improved selectivity of action is maintained even when the contact time is prolonged beyond that necessary to obtain the desired conversion of the methane and at higher temperatures.

A natural gas of the above specified composition was also used to produce synthesis gas by reaction with iron oxide. Various iron oxides were used under different conditions of temperature and contact time. The optimum results were obtained at a temperature of about 2200° F. and with a flow rate of about 2.4 cubic feet of methane per hour per pound of iron oxide. (The iron oxide was in this form resulting from oxidation of the reduced iron with air in the usual regeneration after a previous use and was substantially in the form of $Fe_3O_4$.) Under these conditions about 88% of the methane was reacted and a synthesis gas of the following approximate average composition was produced:

| | Percent |
|---|---|
| CO | 26 |
| $CO_2$ | 6.5 |
| $H_2$ | 62 |
| $CH_4$ | 4 |
| Undetermined | 1.5 |

When, on the other hand, the reaction was carried out with potassium oxide [1] [2] as a catalyzer, about 84% of the methane was reacted and a synthesis gas having the following approximate average composition was obtained:

| | Percent |
|---|---|
| CO | 27.5 |
| $CO_2$ | 1.6 |
| $H_2$ | 65.2 |
| $CH_4$ | 4.3 |
| Undetermined | 1.4 |

[1] For reasons which will be explained below, a small amount of chromium oxide was also added to the iron oxide.
[2] The original concentration of potassium oxide was about 5% based on the iron oxide, but due to volatilization of this material the concentration rapidly decreased with successive periods of use.

As seen by these analyses, the synthesis gas is equivalent, if not slightly better in quality, to that obtained without the alkali catalyzer. This synthesis gas was obtained in a yield of approximately 150% based on the case without the catalyst. The increased yield was obtained at the expense of the formation of elemental carbon and was due to the directive effect of the catalyzer in causing the methane to react in the desired manner. It was also possible to obtain this result at a somewhat lower temperature (about 2000° F.) and with a larger flow rate (9.2 cubic feet per hour per pound of iron oxide).

While lithium oxide, sodium oxide and potassium oxide are suitable catalyzers, sodium oxide is preferred for the present process because of its low vapor pressure at the reaction temperature, and its cheapness.

The amount of alkali metal oxide (or a mixture thereof) required to catalyze the reaction is not large, although large amounts may be employed. Thus, concentrations ranging from a fraction of a percent (for instance 0.1%) up to about 30% may be employed. The concentrations are based on the reducible metal oxide employed as the reactant.

The alkali catalyst may be incorporated with the reducible metal oxide reactant in the form of any compound convertible to the oxide at the reaction temperature. The carbonates, bicarbonates, nitrates, and acetates are quite suitable.

The process of the invention may be carried out using various of the reducible metal oxides hitherto reacted with methane. Not all such oxides are however suitable. As pointed out, the process of the invention is carried out at higher temperatures in order to favor the production of synthesis gas rather than carbon black. Thus temperatures in the order of 2000° F. are employed. Consequently only such metal oxides may be employed as do not melt or form liquid reduction products under the reaction conditions or the reoxidation conditions, which, as explained later, usually entail a somewhat higher temperature than the reaction. Examples of suitable metal oxides are the oxides of Fe, Co, Cr, Ni, Mo, Mn, V, Ti, either alone or in various combinations. The various applicable metal oxide reactants are not equivalent, however. The oxides of Mo, Mn, V and Ti require, in general somewhat higher temperatures than iron oxide for optimum results. Iron oxide is a preferred reactant.

While iron oxide is a preferred reactant, it can be even more advantageously used in combination with a second metal oxide. Thus, a minor amount of any of the various metal oxides which are known to retard or make more difficult the reduction of iron oxide to metallic iron may advantageously be combined with the iron oxide. Suitable oxides, by way of example, are the oxides of Al, Mg, Si, Cr, W, Mo, and Mn. These metal oxides are more difficultly reducible than iron oxide. The amount of such oxide to be combined with the iron oxide is not critical. Thus, concentrations in the order of 5% are suitable, but larger or smaller amounts down to about 1% may be employed. Also the mineral chromite may be advantageously employed. This material contains the iron oxide and chromium oxide combined in a refractory spinel. When the metal oxide combined with the iron oxide is less reducible than iron oxide, it probably takes no part in the reaction. However, the presence of a minor amount of such a second metal oxide with iron oxide allows the process period to be lengthened which is most advantageous for commercial operation.

The process may be carried out using any one of the techniques commonly used when contacting a gas with solid particles. Thus, the metal oxide in the form of granules or shaped pieces may be disposed in a fixed bed through which the methane is passed for a given process period followed by reoxidation of the reduced metal and/or metal oxide. Also the metal oxide granules may be cycled continuously through a reaction zone and a separate oxidation zone. Likewise the metal oxide may be employed as a fine powder using the recirculating fluidized technique or the fixed bed fluidized technique.

In general the reaction temperature is preferably between about 1800° F. and 2300° F. As pointed out above, the optimum temperature within this applicable range will vary somewhat with the particular metal oxide utilized as the reactant.

The reaction may be carried out at any desired pressure. However, some metal oxide reactants are more suitable for reaction under superatmospheric pressures than others. Chromium oxide, for example, is preferably employed at pressures below about 10 atmospheres. Iron oxide, on the other hand, may be advantageously employed at pressures up to 50 or more atmospheres. When utilizing the fixed bed technique, operation under a superatmospheric pressure is preferred. For example, the reaction may be advantageously carried out at a pressure of from about 10 to 50 atmospheres. When using techniques involving circulation of the solid metal oxide through the reaction zone and a separate reoxidation zone operation under substantial pressure usually involves serious engineering problems and in such cases operation at ordinary or moderate pressures is usually advisable. Operation under substantial super-atmospheric pressures using the circulating technique is however feasible using some of the known methods, for example that disclosed by a coworker in application Serial No. 629,678, filed November 19 1945. (Now abandoned.)

It has been observed, when carrying out the methane-metal oxide reaction in the presence of an alkali catalyzer utilizing any one of the fixed bed techniques, that the composition of the synthesis gas varies somewhat as the reaction in any given process period progresses. After a period of time, the ratio of hydrogen to carbon monoxide tends to increase. This indicates that the rate of reaction (2) above begins to overtake that of reaction (1). This may be due to the abovementioned autocatalytic effect of carbon produced, to catalyzation of reaction (2) above by the reduced metal or metal oxide, or to a somewhat decreased temperature caused by the endothermic heat of the reaction. In the process of the present invention the process period (i. e. the contact time of the metal oxide with methane in the reaction zone under reaction conditions) is curtailed to the point where the average synthesis gas produced in the process period contains at least one mole of carbon monoxide to three moles of hydrogen. This maximum process period, which may be easily determined for any given case, will depend upon the amount of metal oxide in the reaction zone, the rate of flow of the methane, the particular metal oxide used, the method of supplying the endothermic heat of the reaction, the state of the metal oxide in the reaction zone (i. e. whether in fixed bed or "fluidized") and the concentration of diluent or carrier material, if any, with the metal oxide reactant. The most important factor is the amount of metal oxide in the reaction zone. In general the greater the amount of metal oxide in the reaction zone, the larger the permissible process period. This is not only due to the greater amount of metal oxide reagent present, but is also due to the fact that the greater amount of metal oxide takes up a larger amount of sensible heat during the reoxidation step which is then available in the reaction step, thus tending to maintain a suitable reaction temperature over a greater period of time. In the above examples, chosen merely to illustrate principles, the process period (reaction period) was uniformly 16 minutes. However the examples were carried out in relatively small scale and are not necessarily indicative of the reaction period possible in larger scale operation. In these examples, part of the heat of reaction was supplied to the reaction zone by a separate heating means. In larger scale operation the supplying of any appreciable proportion of the necessary heat directly to the reaction zone during reaction by secondary heating means (other than permissible preheating of the methane and/or metal oxide) is most difficult from an engineering standpoint. The necessary heat can be easily supplied by induction heating but the method is believed to be economically feasible only in a few cases.

For these reasons it is usually desirable to supply at least the major amount of the heat of the reaction by means of sensible heat in the metal oxide. This sensible heat is preferably supplied, at least in major part, by the heat of reaction of the reoxidation of the metal or metal oxide. In order to increase this sensible heat, the metal oxide reactant may be diluted with an inert heat carrier material which may be simply intermixed or may serve as a carrier or support for the active metal oxide. The material chosen for this purpose is preferably a material having a reasonably good heat conductivity, relatively high density and low surface area, i. e. a material substantially devoid of fine pores and a total surface area (as measured by the usual nitrogen adsorption methods) below about 10 square meters per gram. Particularly suitable materials are for example silicon, alpha alumina, beta alumina, silica (fused) "Vicor" glass, chromium, zirconium oxide and silicon carbide. Silicon, zirconium oxide and beta alumina are particularly suitable because of their lesser tendency to catalyze reaction (2), above. Such heat carrying materials, if used, are preferably used in the amount necessary to supply the deficiency in heat requirement above that provided by the active metal oxide. This will depend upon the particular case and can be adjusted during operation to afford the optimum results. This, if the reaction period is limited by the temperature drop before the desired proportion of the available metal oxide has reacted with the methane, the ratio of metal oxide reactant to inert heat carrier material is decreased, whereas if the process period is limited by exhaustion of the metal oxide reactant without undue temperature drop, the ratio of metal oxide reactant to inert heat carrier is increased. My experiments indicate that a certain amount of control of the composition of the synthesis gas produced may be effected by control of the amount of metal oxide reactant available in the reaction zone during a given process period; the ratio of hydrogen to carbon monoxide decreases as the amount of available metal oxide is increased (except for very high impracticable ratios which may be disregarded). Since the heat requirements for a given process period are substantially constant, the control will be effected through control of the ratio of active metal oxide to inert heat carrier in the reaction zone. When using iron oxide ($Fe_3O_4$) as the reactant, I prefer to adjust the amount used so that not more than 25% of the oxygen is reacted in a given process period. While this limitation is not necessary, it allows a greater proportion of the sensible heat to be supplied by the metal oxide reactant, rather than an inert heat carrier, and allows a more selective reaction, particularly when using the iron oxide in a "fluidized state."

The reoxidation of the reduced metal and/or metal oxide may be effected in a separate step in the same zone or in a different zone according to the technique employed. The reoxidation is preferably effected with air or oxygen; however, steam and/or carbon dioxide may also be employed, either alone or in admixture with air or oxygen. Reoxidation with air or oxygen is exothermic and can be used to supply the endothermic heat of the methane-metal oxide reaction. Reoxidation with steam and/or carbon dioxide is endothermic. If these reagents are used, the heat of reaction must be supplied by separate heating in one of the various known ways. However, the use of a minor amount of steam and/or carbon dioxide can advantageously be used in conjunction with air or oxygen to balance the exothermic heat of the reoxidation with the endothermic heat of the reaction. Since it is in general desired to supply at least the major part of the endothermic heat of reaction by the heat of the reoxidation step, the reoxidation step is in general preferably carried out at a temperature at least somewhat higher than the desired average temperature of the methane-metal oxide reaction.

The reoxidation is preferably carried out at or near atmospheric pressure. However, reoxidation under superatmospheric pressure is possible and in fact is often preferred when utilizing a circulating technique wherein the metal oxide is continuously passed through the reaction zone and a separate reoxidation zone.

While the ratio of hydrogen to carbon monoxide in the synthesis gas product can be increased by the use of a small amount of steam with the methane, this is not usually necessary or in fact desirable. The use of steam in the reaction zone in more than small amounts greatly increases the heat requirements. Furthermore, high ratios of hydrogen to carbon monoxide are not usually desired. As pointed out above, the ratio of hydrogen to carbon monoxide may be controlled by control of the process period and/or by the control of the amount of metal oxide reactant employed. When it is desired to produce a synthesis gas having a very low ratio of hydrogen to carbon monoxide, however, a minor amount of carbon dioxide may be supplied with the methane. Unreacted carbon dioxide, as well as the small amount formed in the process, may be separated from the synthesis gas by known methods and recycled, if desired. On the other hand, the entire synthesis gas product may be passed over a catalyst for reaction of the residual methane with the carbon dioxide according to the equation: $CH_4 + CO_2 \rightarrow 2CO + 2H_2$ in the known manner.

As noted above, some elemental carbon is always formed in the present process and in some cases the amount may be appreciable. Part of this elemental carbon passes out of the reaction zone suspended in the synthesis gas and part remains with the metal oxide. The carbon removed from the reaction zone may be recovered, if desired. The carbon remaining with the metal oxide is oxidized in the reoxidation step, imparting heat to the metal oxide. The formation of elemental carbon, while not entirely avoidable, is however not an object of the process of the invention; it is incidental and avoided as far as possible.

The invention claimed is:

1. In a cyclic process for the production of synthesis gas by the reaction of methane with a solid reducible metal oxide in the absence of steam wherein the reaction is periodically discontinued and the resulting reduced metal oxide is reoxidized, the improvement which comprises effecting the reaction at a temperature between about 1850° F. and 2300° F. in the presence of an alkali metal oxide catalyzer.

2. Process according to claim 1 in which the alkali metal oxide catalyzer is present in an amount between 0.1% and about 30% based on said reducible metal oxide.

3. In a cyclic process for the production of synthesis gas by the reaction of methane with a solid reducible metal oxide in the absence of steam wherein the reaction is periodically discontinued and the resulting reduced metal oxide is reoxidized, the improvement which comprises effecting the reaction with iron oxide as the reducible metal oxide at a temperature between about 1850° F. and 2300° F. in the presence of an alkali metal oxide catalyzer.

4. Process according to claim 3 in which a minor amount of a more difficultly reducible metal oxide in the absence of steam is combined with the iron oxide.

5. In a cyclic process for the production of synthesis gas by the reaction of methane with a reducible metal oxide in the absence of steam wherein the reaction is periodically discontinued and the resulting reduced metal oxide is reoxidized, the improvement which comprises effecting the reaction at a temperature between about 1850° F. and 2300° F. in the presence of sodium oxide as a catalyzer.

6. In a cyclic process for the production of synthesis gas by the reaction of methane with a reducible metal oxide in the absence of steam wherein the reaction is periodically discontinued and the resulting reduced metal oxide is reoxidized, the improvement which comprises effecting the reaction at a temperature of about 2200° F. with iron oxide as the reducible metal oxide, said iron oxide containing a minor amount of chromium oxide and a minor amount of an alkali metal oxide catalyzer.

7. In a cyclic process for the production of synthesis gas by the direct interaction of methane and a reducible metal oxide in the absence of steam with resulting reduction of said metal oxide, the improvement which comprises effecting the reaction at a temperature between about 1850° F. and 2300° F. with iron oxide as the reducible metal oxide in the presence of an alkali metal oxide catalyzer, discontinuing the reaction before more than 25% of the available iron oxide is reduced and reoxidizing the reduced iron oxide before further contacting it with methane.

DONALD D. DAVIDSON.

(References on following page)

REFERENCES CITED

The following references are of record in the file of this patent:

UNITED STATES PATENTS

| Number | Name | Date |
|---|---|---|
| 314,342 | Moore | Mar. 25, 1885 |
| 1,868,919 | Schmidt et al. | July 26, 1932 |
| 1,868,921 | Schmidt et al. | July 26, 1932 |
| 1,899,184 | De Simo | Feb. 28, 1933 |
| 2,042,285 | Wilke | May 26, 1936 |
| 2,405,395 | Bahlke et al. | Aug. 6, 1946 |
| 2,430,432 | Marisic | Nov. 4, 1947 |